United States Patent [19]
Howard et al.

[11] Patent Number: 6,091,345
[45] Date of Patent: Jul. 18, 2000

[54] SYNCHRONIZED TARGET SUBSYSTEM FOR AUTOMATED DOCKING SYSTEMS

[75] Inventors: Richard T. Howard; Michael L. Book; Thomas C. Bryan, all of Huntsville, Ala.

[73] Assignee: The United States of America as represented by the Administrator of the National Aeronautics and Space Administration, Washington, D.C.

[21] Appl. No.: 09/228,070

[22] Filed: Dec. 10, 1998

[51] Int. Cl.[7] .................................................. G08B 21/00
[52] U.S. Cl. ......................... 340/958; 244/161; 348/119; 701/226
[58] Field of Search ............................. 340/958; 701/226, 701/13, 23; 244/161; 348/117, 119; 250/548, 551; 356/141.2

[56] References Cited

U.S. PATENT DOCUMENTS

| | | | |
|---|---|---|---|
| 5,109,345 | 4/1992 | Dabney et al. | 701/226 |
| 5,334,848 | 8/1994 | Grimm | 356/141.2 |
| 5,490,075 | 2/1996 | Howard et al. | 701/226 |
| 5,734,736 | 3/1998 | Palmer et al. | 382/103 |
| 5,938,717 | 8/1999 | Dunne et al. | 701/119 |

*Primary Examiner*—Brent A. Swarthout
*Attorney, Agent, or Firm*—Robert L. Broad, Jr.

[57] ABSTRACT

A synchronized target subsystem for use in an automated docking or station keeping system for docking a chase vehicle with a target vehicle wherein the chase vehicle is provided with a video camera which provides adjacent frames each having a predetermined time duration. A light source mounted on the target vehicle flashes at a frequency which has a time duration which is a multiple of the duration time of the frames, the light being on for at least one frame duration and being off for the remainder of the cycle. An image processing unit is connected to the camera for receiving signals from the camera and subtracting one of the adjacent frames from the other to detect whether the light appears in one frame, both frames or neither frame. If the target light appears in both frames or neither frame, the image processing unit feeds a signal to a timing circuit to advance the video camera one frame. This process is continued until the target light appears in one frame and not in the other, at which time the process of advancing the video camera is stopped.

4 Claims, 2 Drawing Sheets

# SYNCHRONIZED TARGET SUBSYSTEM FOR AUTOMATED DOCKING SYSTEMS

ORIGIN OF THE INVENTION

This invention was made by employees of the United States Government and may be manufactured and used by or for the Government without the payment of any royalties.

1. Field of the Invention

This invention relates to subsystems for automated docking or station keeping systems.

2. Prior Art

U.S. Pat. No. 5,490,075 discloses an automated docking system wherein Global Sensing receivers on the target and the chase vehicle synchronize lights on the target and a video imaging device on the chase vehicle such that these lights and the video imaging device operate in synchronism with each other to guide the chase vehicle to the target. A disadvantage of this system is that it requires more equipment (Global Position Sensing receivers on both the target and the chase vehicle).

SUMMARY OF THE INVENTION

A synchronized target subsystem for use in an automated docking or station keeping system for docking a chase vehicle with a target vehicle wherein the chase vehicle is provided with a video camera which provides adjacent frames each having a predetermined time duration. A light source mounted on the target vehicle flashes at a frequency which has a time duration which is a multiple of the duration time of the frames, the light being on for at least one frame duration and being off for the remainder of the cycle. An image processing unit is connected to the camera for receiving signals from the camera and subtracting one of the adjacent frames from the other to detect whether the light appears in one frame, both frames or neither frame. If the target light appears in both frames or neither frame, the image processing unit feeds a signal to a timing circuit to advance the video camera one frame. This process is continued until the target light appears in one frame and not in the other, at which time the process of advancing the video camera is stopped.

DETAILED DESCRIPTION OF THE INVENTION

Figure 1:
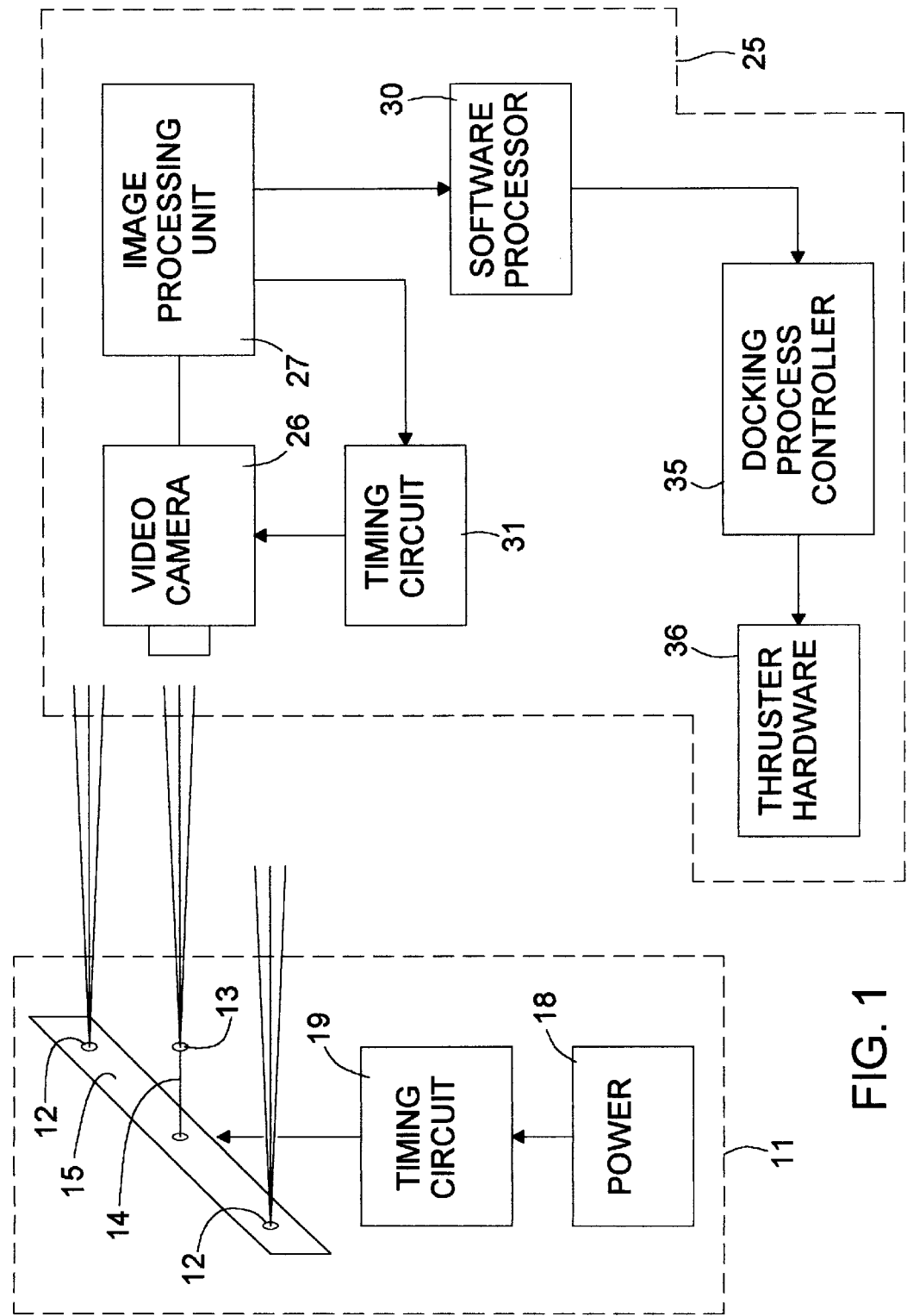
FIG. 1 is a schematic drawing of the system of this invention showing the various components making up the system.

Referring now in detail to the drawing, there is shown a synchronized target subsystem having a system of lights mounted on a target vehicle 11, the system including a pair of lights 12 mounted on a base plane 15 and a third light 13 mounted on the end of a post 14 extending from the base plane between the lights 12. A timing circuit 19 connected to a power supply 18 is connected to the lights 12 and 13 to cause the light to flash at a predetermined frequency described below.

A chase vehicle 25 carries a video camera 26 aimed to receive light from the lights 12 and 13 on the target vehicle. The video camera provides video frames at a 30 Hz rate, each frame consisting of two 1/60th second fields which are interlaced to form the 1/30th second frame. The lights 12 and 13 flash at a 30 Hz rate, with the lights being on during the first 3/60 seconds of a cycle (one and a half frames) and being off for the remainder of the cycle, 9/60 seconds.

The camera 26 feeds a signal to an image processing unit 27 which subtracts one video frame from the adjacent frame. If the target lights show in the one frame but not the other the image processing unit feeds a signal to a software processor 30 which controls the docking in the manner described in U.S. Pat. No. 5,490,075, which patent is incorporated herein by reference.

Figure 2:
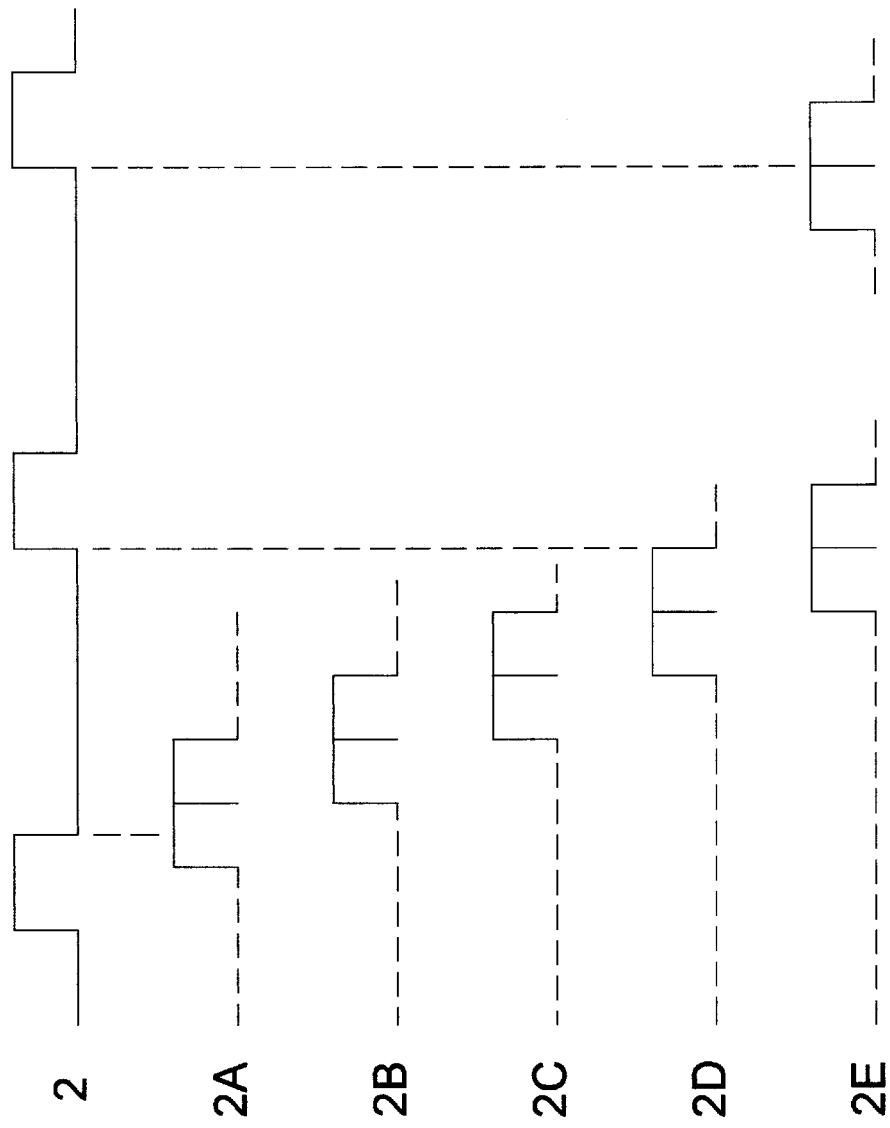
FIG. 2 is a drawing showing the relationship between the target light and the video camera frames showing how the video frames are advanced one frame at a time from the time the system is turned on at 2A until the target light shows in one frame but not the other at 2E.

In FIG. 2 the reference numeral 2 represents the target lights and reference numerals 2A–2E represent video frames. If target lights show in part of one frame but not the other frame, as in FIG. 2A, the image processing unit 27 sends a signal to a timing circuit 31 to cause the timing circuit to feed a signal to the video camera 26 to advance the video camera one frame. This process is continued until the target lights show in one frame but do not show in the adjacent frame, as in 2E. From this point on the video camera 26 is synchronized with the flashing lights and the docking or station keeping procedure is carried out by a docking process controller 35 and thruster hardware 36 as described in the above-referenced patent. By "station keeping" we mean that the chase vehicle maintains a fixed spatial relationship with the target vehicle without docking.

What is claimed is:

1. A synchronized target subsystem for use in automated docking or station keeping systems wherein a chase vehicle is docked with a target vehicle, said synchronized target subsystem comprising:

a. a video camera mounted on the chase vehicle, said camera being capable of providing frames of video images each having a predetermined time duration, b. a light source mounted on the target vehicle, c. means on the target vehicle for applying power to the light source to cause the light source to flash at a frequency which has a time duration which is a multiple of the time duration of said frame, during each cycle said light source being on for at least one frame duration and off for the rest of said cycle, d. an image processing unit connected to the video camera for processing signals from said camera to provide a signal representing two adjacent frames, said image processing unit subtracting one of the frames from the other to detect whether the target light appears in one frame, both frames or neither frame, and e. a timing circuit for receiving a signal from the image processing unit when the unit detects a light in both or neither of the frames and feeding a signal to the video camera to advance said camera one frame, said process continuing until the video image shows the target light in one frame and no target light in said adjacent frame.

2. The target subsystem of claim 1 wherein the target vehicle is provided with a power supply and a timing circuit, said timing circuit connecting the power supply to the lights to cause said lights to be on for at least one frame duration and off during the rest of each cycle.

3. The subsystem of claim 2 wherein the pair of first lights on the target vehicle are spaced from each other on a base plane and a second light is mounted on a post between the first lights.

4. The subsystem of claim 2 wherein the chase vehicle has means for docking with the target vehicle.

* * * * *